Dec. 28, 1926.
J. H. SANDLIAN
TOWING CONNECTION
Filed June 6, 1925    2 Sheets-Sheet 1
1,612,060
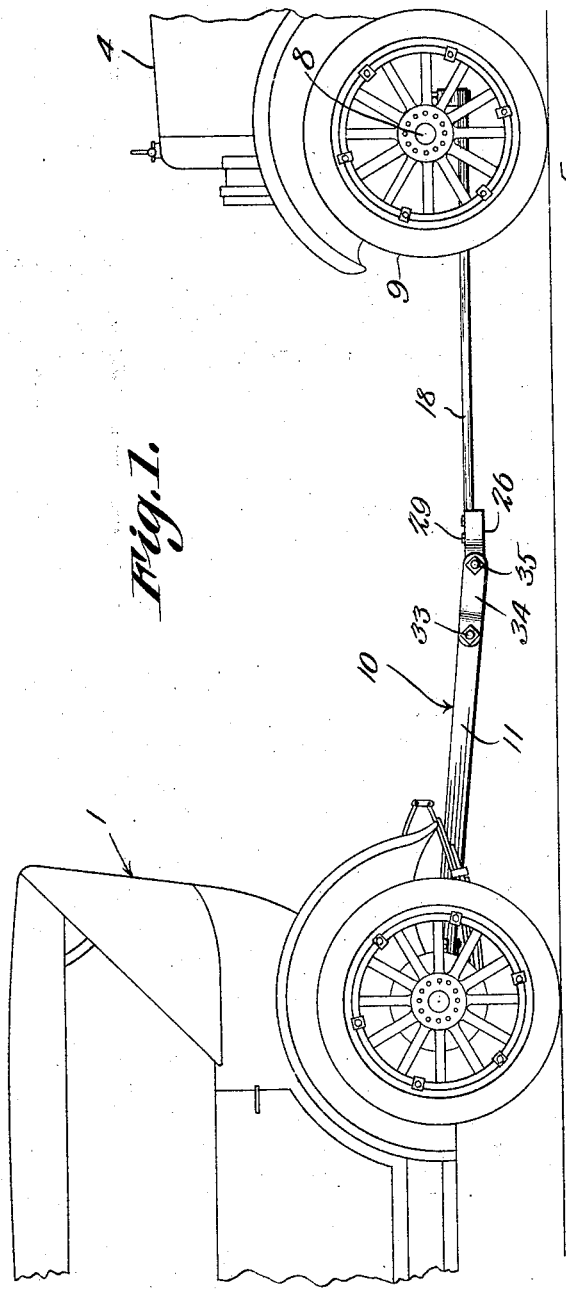
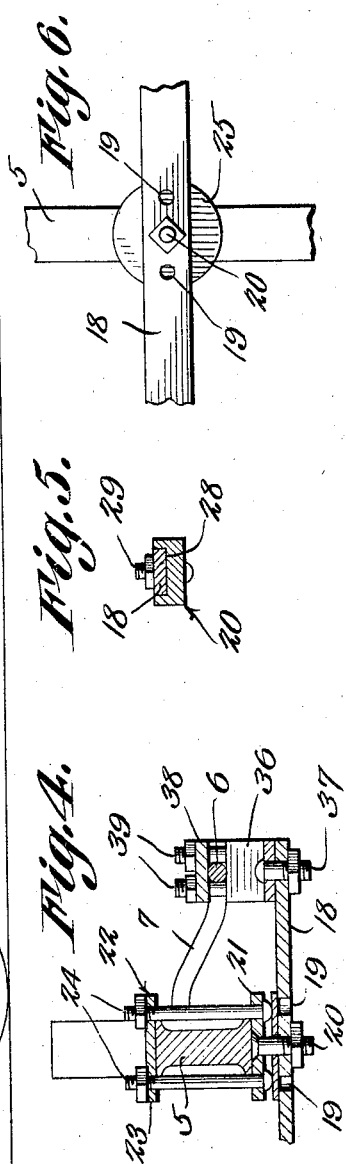
Inventor
J. H. Sandlian
By C. A. Snow & Co.
Attorneys Dec. 28, 1926.
J. H. SANDLIAN
1,612,060
TOWING CONNECTION
Filed June 6, 1925 2 Sheets-Sheet 2
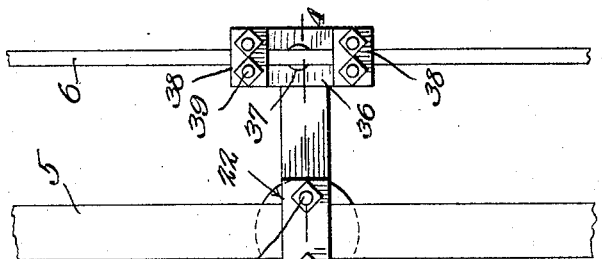
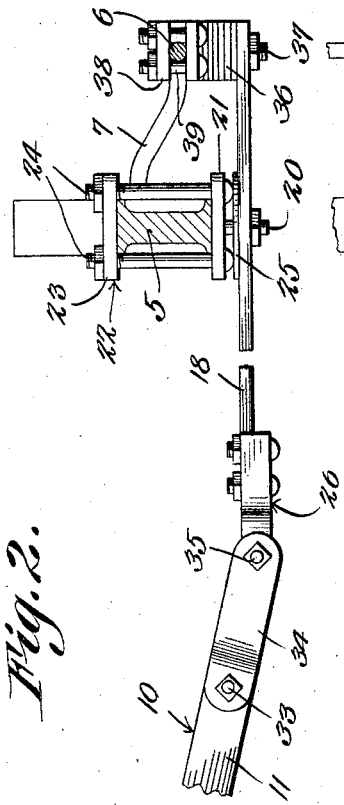
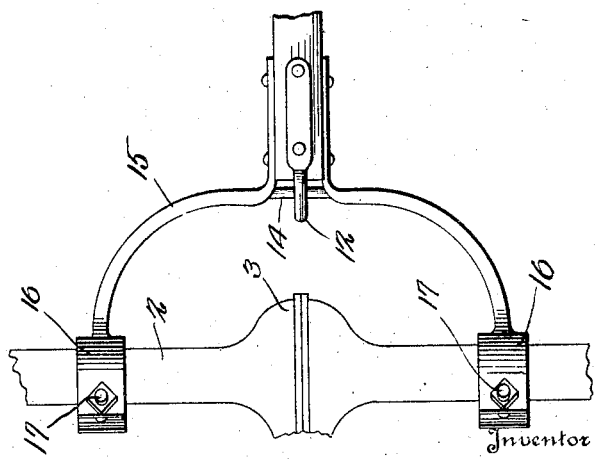
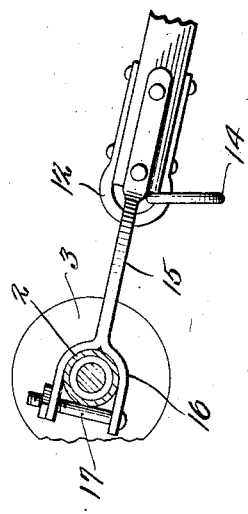
Inventor
J. H. Sandlian
By C. A. Snow & Co.
Attorneys.

Patented Dec. 28, 1926.

1,612,060

UNITED STATES PATENT OFFICE.

JAMES H. SANDLIAN, OF CEDAR BLUFFS, KANSAS, ASSIGNOR OF ONE-HALF TO ROBERT H. CRAIG, OF CEDAR BLUFFS, KANSAS.

TOWING CONNECTION.

Application filed June 6, 1925. Serial No. 35,411.

This invention aims to provide novel means whereby a vehicle may be towed by another vehicle and be steered automatically by the towing vehicle so that it will follow in the wake of the towing vehicle.

Figure 1 shows in side elevation, a device constructed in accordance with the invention, and assembled with two vehicles; Figure 2 is a side elevation; Figure 3 is a top plan; Figure 4 is a section taken about on the line 4—4 of Figure 3; Figure 5 is a section taken about on the line 5—5 of Figure 3; Figure 6 is a fragmental plan illustrating one of the connections.

The numeral 1 marks a towing vehicle including a rear axle housing 2, the differential casing appearing at 3. The towed vehicle is shown at 4 and its front axle at 5. The numeral 6 marks the drag link connected at 7 to the movable axle ends 8 whereon the forward wheels 9 are journaled. The parts above described are common, and no novelty is claimed for them, saving in so far as they may enter into patentable combinations with parts hereinafter described.

In carrying out the invention there is provided a link 10 including a bar 11 on the forward end of which there is a clevis 12 supporting a ring 14, to the end that the link may be connected to the towing vehicle otherwise than as hereinafter described. Preferably, the bar 11 carries at its forward end a fork 15, the forwardly presented diverging arms of which have U-shaped jaws or connecting elements 16 receiving the axle housing 2 of the vehicle 1 and held thereon by securing devices 17, such as bolts, mounted in the jaws 16 in front of the axle housing 2. The connection thus afforded preferably is of such a nature that the link 10 can have vertical swinging movement on the axle housing 2, the differential casing 3 being received between the arms of the fork 15, and the construction being such that the link 10 cannot swing horizontally with respect to the rear axle housing 2.

The numeral 18 marks a horizontally swinging lever, and a means is provided whereby this lever is fulcrumed intermediate its ends on the front axle 5 of the towed vehicle 4. Having this consideration in mind, the lever 18 has a plurality of longitudinally spaced openings 19 adapted to receive, for adjustment, a fulcrum stud 20 carried by the lower member 21 of a clamp bracket 22 including an upper member 23, the front axle 5 of the towed vehicle 4 being received between the members 21 and 23 of the clamp bracket 22, the said members being connected, to hold them on the axle 5, by securing elements 24 such as bolts. A wear plate 25 is mounted on the fulcrum stud 20 and is interposed between the lever 18 and the heads at the lower ends of the bolts 24. The numeral 26 designates a head having arms 27 at its forward end. The head 26 has a socket 28 in its upper surface, receiving the forward end of the lever 18, the lever abutting against the head at the forward end of the socket, and being held in the socket by bolts 29 or the like. Rigid inner straps 30 are connected by securing devices 32 and 33 with the rear end of the bar 11 of the link 10, the securing device 33 retaining rigid outer straps 34. The rear ends of the straps 30 and 34 are spaced apart to receive between them the arms 27 of the head 26, the said arms and the rear ends of the straps being connected by a pivot element 35, so that the link 10 can swing vertically with respect to the lever 18.

It is contemplated that the rear end of the lever 18 shall be connected pivotally to the drag link 6, and because the distance between the drag link and the front axle 5 varies in different vehicles, the lever 18 is supplied with the plurality of openings 19 for the adjustable reception of the fulcrum stud 20. In connecting the rear end of the lever 18 with the intermediate portion of the drag link 6, recourse is had to a detachable clamp including a bridge piece 36 which is downwardly curved intermediate its ends, the central portion of the bridge piece 36 being connected by a pivot element 37 with the rear end of the lever 18. The upper members of the clamp are designated by the numeral 38 and are connected by bolts 39 or the like with the ends of the bridge piece 36, the drag link 6 being bound tightly between the parts 36 and 38.

Vertical swinging movement between the lever 18 and the link 10 is possible, but there is no horizontal swinging movement there. The result is that the lever 18 will swing horizontally, responsive to the movements of the vehicle 1, transmitted through the link 10, the lever 18 imparting longitudinal movement to the drag link 6, the forward wheels 9 of the vehicle 4 being turned, the said vehicle not only being towed, but, as well, being steered automatically by the towing vehicle 1, to follow the towing vehicle, without attention from the occupants of either vehicle.

Although a preferred form has been shown, it will be understood that a mechanic, instructed by the foregoing disclosure, and working within the scope of what is claimed, may make such changes as the skill of his calling may suggest, without departing from the spirit of the invention, or placing the utility thereof in jeopardy.

I claim:—

1. A device for hitching a towed vehicle to a towing vehicle, embodying a clamp for mounting on the forward axle of a towed vehicle and provided with a depending stud, a lever held intermediate its ends on the stud for horizontal swinging movement, a bridge piece having a downwardly curved central portion and raised ends, means for attaching the ends of the bridge piece to the underside of the drag link of the towed vehicle, the rear end of the lever extending across the downwardly curved portion of the bridge piece and being pivoted thereto, the bridge piece serving to compensate for the vertical elevation of the drag link with respect to the lower edge of the forward axle, the lever having a plurality of holes for the stud, the holes being spaced apart lengthwise of the lever, so as to adapt the device to vehicles wherein the horizontal distance between the front axle and the drag link varies, a link, means for connecting the rear end of the link to the forward end of the lever for vertical swinging movement, and means for connecting the forward end of the link to a towing vehicle.

2. A device for hitching a towed vehicle to a towing vehicle, embodying a clamp made up of upper and lower members between which the forward axle of the towed vehicle is located, the lower member having a fulcrum stud, securing devices connecting the upper and lower members of the clamp, parts of the securing devices extending below the lower member, a lever held on the stud for horizontal swinging movement, and having a plurality of holes for the stud, the holes permitting the lever to be adjusted lengthwise, a wear plate on the stud and interposed between said parts of the securing devices and those of the holes which are open, thereby to prevent said parts of the securing devices from riding over the holes when the lever is swung on the stud, means for connecting the rear end of the lever to the drag link of a towed vehicle, and means for connecting the forward end of the lever to a towing vehicle.

In testimony that I claim the foregoing as my own, I have hereto affixed my signature.

JAMES H. SANDLIAN.